(12) United States Patent
Ang et al.

(10) Patent No.: US 11,592,599 B2
(45) Date of Patent: Feb. 28, 2023

(54) FLAT TOP DIFFUSER FOR LASER APPLICATION

(71) Applicant: LUMINIT LLC, Torrance, CA (US)

(72) Inventors: Anthony Ang, Torrance, CA (US); Casey Scott Irvin, Torrance, CA (US); Riberet Almeida, Torrance, CA (US)

(73) Assignee: LUMINIT LLC, Torrance, CA (US)

( * ) Notice: Subject to any disclaimer, the term of this patent is extended or adjusted under 35 U.S.C. 154(b) by 390 days.

(21) Appl. No.: 16/856,453

(22) Filed: Apr. 23, 2020

(65) Prior Publication Data

US 2021/0333442 A1    Oct. 28, 2021

(51) Int. Cl.
*G02B 3/00* (2006.01)
*G02B 5/02* (2006.01)
*G02B 27/09* (2006.01)

(52) U.S. Cl.
CPC ......... *G02B 3/0062* (2013.01); *G02B 3/0043* (2013.01); *G02B 27/0927* (2013.01); *G02B 27/0938* (2013.01)

(58) Field of Classification Search
CPC .. G02B 3/0043; G02B 5/0221; G02B 3/0062; G02B 27/0927
See application file for complete search history.

(56) References Cited

U.S. PATENT DOCUMENTS

2020/0386919 A1\* 12/2020 Arima ................. G02B 5/0221

\* cited by examiner

*Primary Examiner* — Ryan D Howard

(57) ABSTRACT

A micro-optic cell design with a regularly spaced micro-lens array, having a series of randomly positioned lenslets that have been digitally overwritten, wherein the overwritten area is greater than 0 up to 100 percent fill, and wherein a light shaping diffuser pattern is placed on top of the lenslets of the micro-optic cell.

27 Claims, 19 Drawing Sheets

FLAT TOP DIFFUSER FOR LASER APPLICATION

BACKGROUND

The formation of a regular, repeated micro-lens array (MLA) creates high frequency diffracted orders related to the repeated lens pitch across the transverse and longitudinal axes of the structured surface plane when using coherent light. In addition to these orders, a low frequency diffraction pattern forms, which is related to the shape of the aperture. A method of forming a homogenized image expected from a single lenslet is needed for creating outputs such as flat tops/top hat, which the present disclosure addresses.

SUMMARY

Included herein is an optical element, which includes a micro-optic unit cell comprised of one or more lenslets. Each lenslet has a boundary shape and is configured in a regularly spaced micro-lens array (MLA). The lenslets all have the same size and shape initially but are overwritten with randomly placed lenses (RPLs), which cover from 0 to 100 percent of the MLA. A light shaping diffuser pattern is added on top of the lenslets of the micro-optic unit cell.

In one embodiment, the boundary shape of the lenslet encompasses a square, a rectangle, a circle, an ellipse, a hexagon, a star, a cross, a logo, a generic geometrical shape, or a mixture thereof. The lenslet comprises a size with lateral dimensions in the range of about 10-500 micrometers. The size of the micro-optic unit cell is based on lenslet size, beam size, source size, shape of the optical element, or a mixture thereof. The micro-optic unit cell comprises a size with lateral dimensions in the range of about 0.1-500 millimeters. The optical element comprises a size with lateral dimensions in the range of about 0.1 millimeters to about 1 meter. The lenslet can wrap around one or more edges of the micro-optic unit cell.

In one embodiment, the optical element can also include a collimated or partially collimated light source. The light source is a coherent light source or an incoherent light source.

In one embodiment, the intensity or irradiance profile of the micro-optic unit cell comprises a flat top, a gradient, or a mixture thereof.

In another embodiment, a grid used for aligning rows and columns of the MLA is randomized and varied as to a width of each row and as to a length of each column.

In another embodiment, lenslet comprises a portion of a Source Surface Profile (SSP); wherein a vertex of the SSP is shifted by a fixed or random amount in a plane of the MLA with respect to the lenslet boundary; wherein the lenslet boundary is fully filled with a portion of the SSP; wherein a vertex of the SSP is shifted with respect to the lenslet boundary for 0-100% of the lenslets; and wherein the lenslets comprise a same size.

In another embodiment, the MLA comprises an array of rectangular lenslets; wherein the boundary of each lenslet has the same shape and size; wherein a surface of each lenslet is a portion of a same Source Surface Profile (SSP); wherein a width of the SSP is at least twice as wide as a width of the boundary of the lenslet; wherein a length of the SSP is at least twice as long as a length of the boundary of the lenslet; wherein a position of a vertex of an SSP is varied with respect to a center of a boundary of the lenslet for 0-100% of the lenslets; wherein a direction and amount that a position of a vertex of an SSP is varied with respect to a center of the boundary of the lenslet is random or controlled; wherein the lenslet boundary is filled with a portion of the SSP; and wherein a final surface of each lenslet comprises a portion of the SSP that is within the boundary of the lenslet.

In another embodiment, an aspect ratio of each lenslet is the same; wherein a size of each lenslet is scaled in size such that the lenslet fills in its boundary of its row and column; wherein a ratio of a width of the lenslet to a height of the lenslet is constant; and wherein a ratio of a length of the lenslet to a height of the lenslet is constant.

In another embodiment, a grid used for aligning rows and columns of the MLA is randomized and varied as to a y dimension of each row and as to an x dimension of each column.

In another embodiment, the aspect ratio of each lenslet is the same; wherein a size of each lenslet is scaled in size such that the lenslet fills in its boundary of its row and column; wherein a ratio of a width of the lenslet to a height of the lenslet is constant; and wherein a ratio of a length of the lenslet to a height of the lenslet is constant.

In another embodiment, the lenslets comprise rectangles, parallelograms, rhombuses, or squares; and wherein a y dimension of each row is constant along a length of an entire row and an x dimension of each column is constant along an entire column.

In another embodiment, the lenslets comprise rectangles, parallelograms, rhombuses, or squares; and the width of each row is constant along a length of the row of an array and a width of each column is constant along a length of each column of the array.

In another embodiment, the tilt of an optical axis of the lenslets varies and is randomized for some or all of the lenslets.

In another embodiment, the lenslets are rectangles; wherein the y dimension of each row is constant along the entire row; wherein the y dimension of each row varies with respect to the y dimensions of the other rows; wherein the x dimension of each column is constant along the entre column; and wherein the x dimension of each column varies with respect to the x dimension of the other columns.

In another aspect, this application discloses a method of making an optical element comprising a micro-optic unit cell, which includes one or more lenslets, comprising a process of randomization based on statistical uniform distribution functions of a partial or full area of the micro-optic unit cell and a process of digitally adding a pattern of a light shaping diffuser on top of the micro-optic unit cell. The method can include a photolithography process or a direct write laser machine process to make a photoresist master or part.

The micro-optic cell with RPL, randomly centered SSPs or scaled lenslets with an overlaid light shaping diffuser as described herein has several benefits and advantages. One particular benefit is that the final format of the design is robust and repeatable to different boundary shapes of lenslet designs (square, rectangular, circular, elliptical, hexagons, logo, or a generic geometrical shape, which do not have to be centered about the specular ray) and different intensity or irradiance profiles of a lenslet (top hat/flat top, gradient, etc.). The randomness along the edge of the micro-optic cell allows a small formatted area to be seamlessly repeated to a large format, which is useful for flat panels and round drums used in embossing large volumes of optical components. Another benefit is that no diffraction orders are present in the final image. Yet another benefit is that coherent and incoherent light can be used as the projected source.

DETAILED DESCRIPTION

Figure 1:
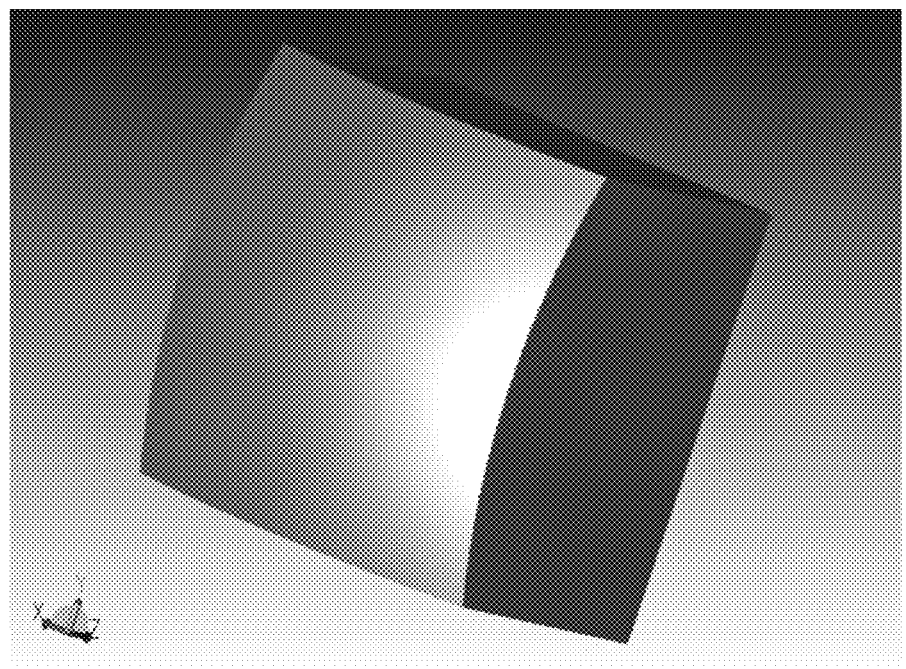
FIG. 1. Single Lenslet for flat top diffuser (FTD) 20×20 degrees Square.
Figure 5:
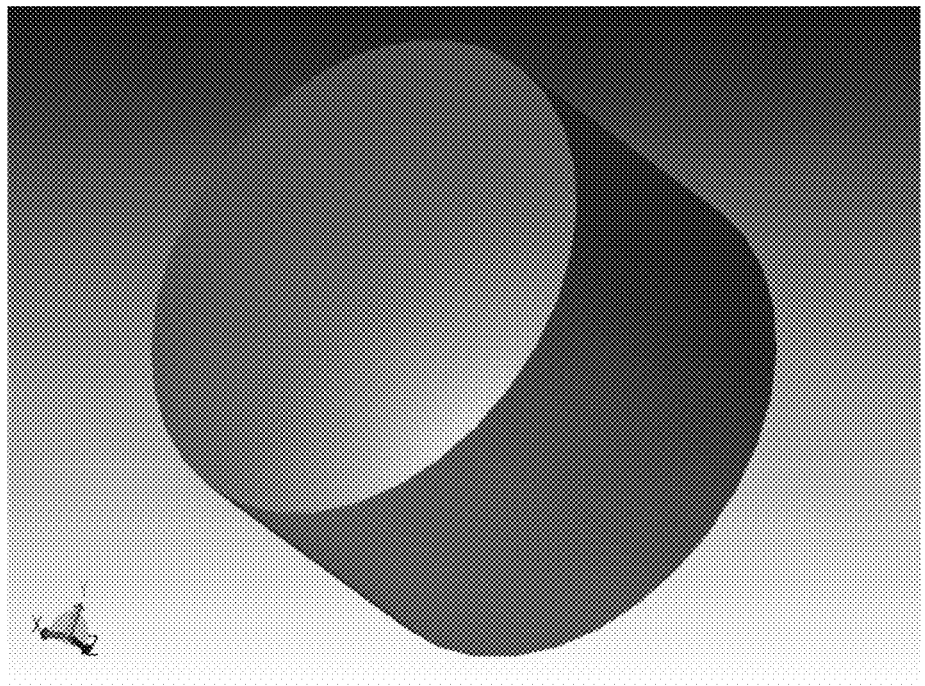
FIG. 5. Single Lenslet for FTD 20 degrees Circle.

Provided herein is an optical element that includes one or more micro-optic unit cells made of one or more lenslets, as shown in FIG. 1 and FIG. 5. The micro-optic unit cell includes a size, XY, filled with lenslet(s) of a size m×n. The shape of the lenslet can be almost any known geometric shape, such as a square, a rectangle, a circle, an ellipse, a hexagon, irregular hexagon, a star, a cross, a logo, a generic shape, or mixtures thereof. Each lenslet has a boundary shape. Each lenslet is a single lens element having a size with lateral dimensions of about 10-500 micrometers. The size of the micro-optic unit cell is based on lenslet size, beam size, source size, shape of the optical element, or a mixture thereof. The lateral dimensions of the micro-optic unit cell are in the range of about 0.1-500 millimeters. The optical element has lateral dimensions ranging from about 0.1 millimeters to about 1 meter. A light shaping diffuser (LSD) pattern can be added on top of the micro-optic unit cell. The lenslet can wrap around one or more edges of the micro-optic unit cell.

The lenslets are initially uniformly distributed within the micro-optic unit cell, then more lenslets are added by digitally overwriting the previous lenslet locations and the newly added lenslets are randomly positioned. Randomly Positioned Lenslets (RPL) refers to one or more lenslets for which part or all of the lenslet is located in a micro-optic unit cell and for which the center of the lenslets are randomly positioned. The orientation of the RPLs are identical to each other and identical to the orientation of the other lenslets in the micro-optic unit cell.

Figure 9:
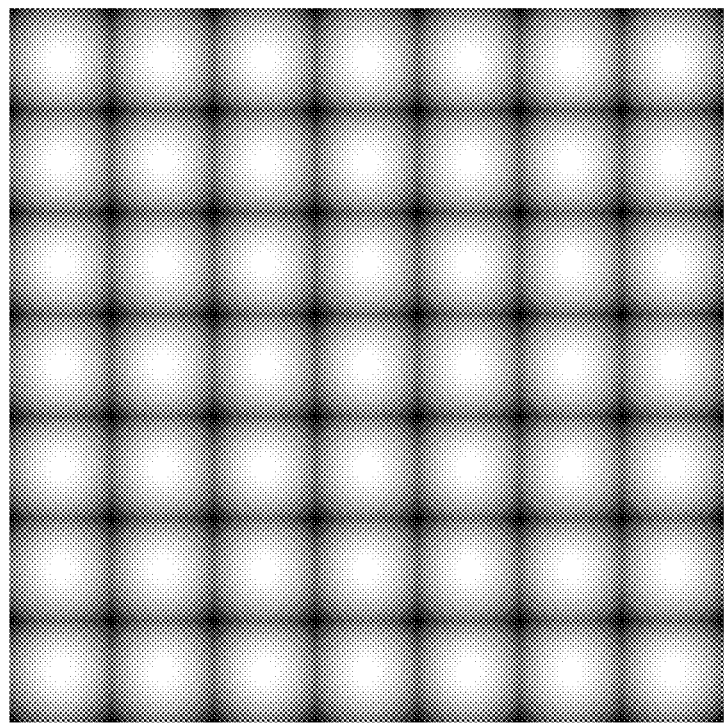
FIG. 9. Regularly spaced micro-lens array (MLA).

The lenslets are configured in a micro-lens array (MLA), which is a composition of lenslets in a regularly spaced lens array where the boundaries of adjacent lenslets are shared with each other and where the lenslets do not overlap each other. An example of a MLA is shown in FIG. 9. For rectangular arrays (including square arrays), the centers of lenslets in each row are co-linear and the centers of each lenslet in each column are co-linear. In the case of a hexagon lenslets, the lenslets are arranged in a hexagonal tiling pattern. In the case of a parallelogram lenslet, the lenslets are arranged a parallelogrammic lattice pattern. In the case a rhombus lenslet, the lenslets are arranged in a rhombic lattice pattern.

In another embodiment, multiple micro-optic unit cells are arranged into a Complete Design, which is a combination of micro-optic unit cells arranged in a pattern, such that they are adjacent to each other, and such that the micro-optic unit cells fill the entire area of the Complete Design with no gaps between adjacent micro-optic unit cells. An example of the size of the lateral dimensions of a Complete Design can be in the range from 0.1 millimeter to about 1 meter.

In another embodiment, the lenslets are not arranged in a perfect MLA, yet the lenslets have regular, multiple-centered spacings. The RPL involves each lenslet with sag(Z)

profile, which is placed in a random position across X and Y independently. The lenslet writing process, described in detail below, is iterated in the framework of the micro-optic cell design until all blank areas are overwritten with the form of the lenslet for RPL100 (randomly positioned lenses 100% fill). The lenslets are overwritten with RPLs, which cover from 0 to 100 percent of the MLA.

This writing process can also involve an MLA with a partially filled RPL where the number indicates the approximate percentage fill of the RPL. The partially filled RPL can have values between 1 and 99 percent. In one embodiment, the partially filled RPL is RPL25 (25% filled). In the writing process, when a new lenslet is randomly positioned in an area previously filled with a portion of another lenslet, the area is overwritten with the new lenslet. The result is a full lens overlapping a partial lens. The writing process is repeated and formed randomly, and can occur several times during the design of the micro-optic cell. If the cell is large enough to have a sufficient number of lenslets, then for each bin in the sag(Z) histogram of the cell, the value should be within about 10% of the value of a single lenslet. In an alternative embodiment, the intent is to have zero order or specular light where the unit cell does not have to be filled 100% by the lenslets.

In another embodiment, the tilt of an optical axis of the lenslets varies for a percentage of the lenslets (from 0% to 100%) is randomly varied for 0% to 100% of the lenslets. In another embodiment, the lenslets all have the same orientation (not rotated) with respect to each other.

In another embodiment, the optical element includes one or more micro-optic unit cells; where each micro-optic unit cell is comprised of one or more lenslets; where each lenslet has a boundary shape; where the lenslets are configured in a regularly spaced micro-lens array (MLA); where the lenslets are overwritten with randomly placed lenses (RPLs), which cover from 0 to 100 percent of the MLA; and where a light shaping diffuser pattern is added on top of the micro-optic unit cell.

Figure 2:
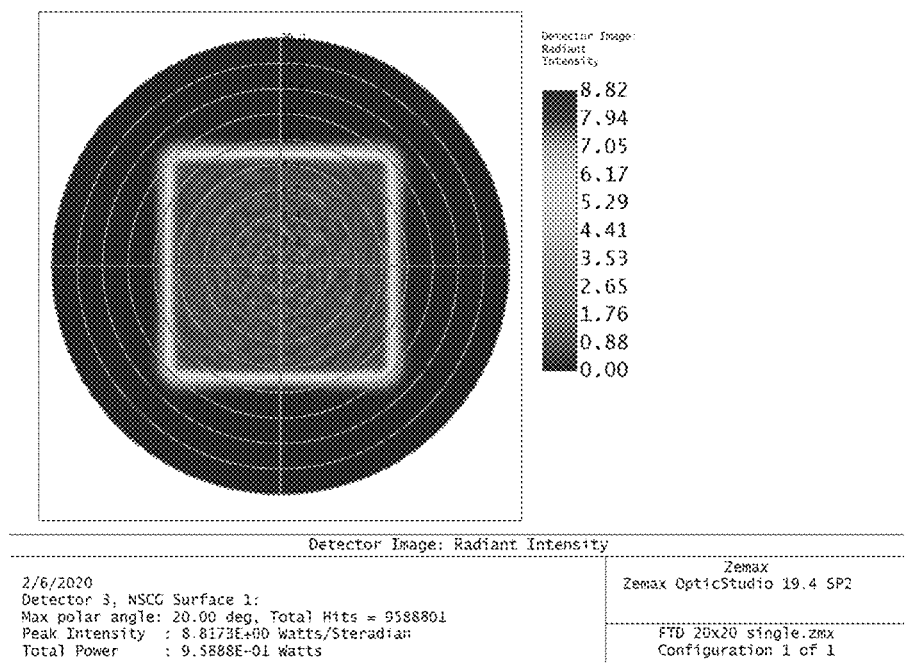
FIG. 2. Geometrical bidirectional scatter distribution function (BSDF) of a FTD at 20×20 degrees Square.
Figure 3:
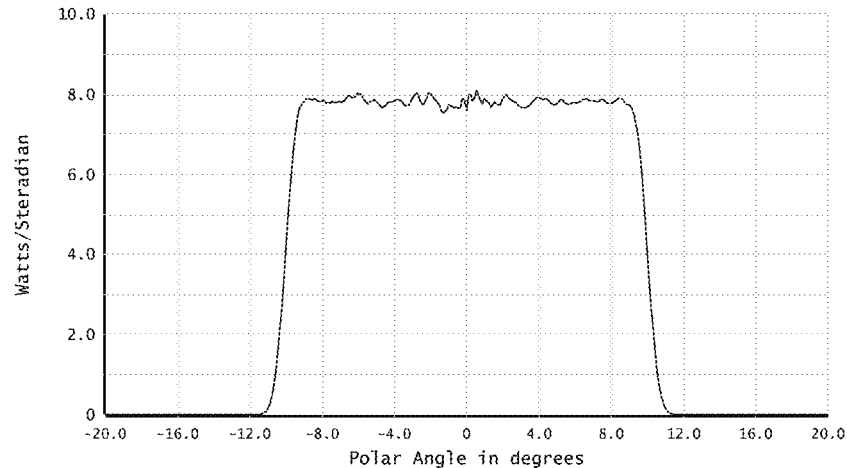
FIG. 3. Geometrical Horizontal Intensity Profile of a FTD 20×20 degrees Square.
Figure 4:
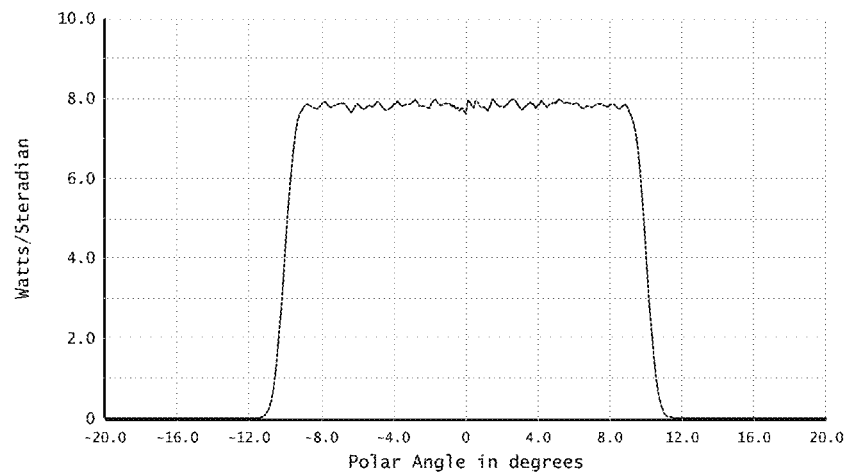
FIG. 4. Geometrical Vertical Intensity Profile of a FTD 20×20 degrees Square.
Figure 6:
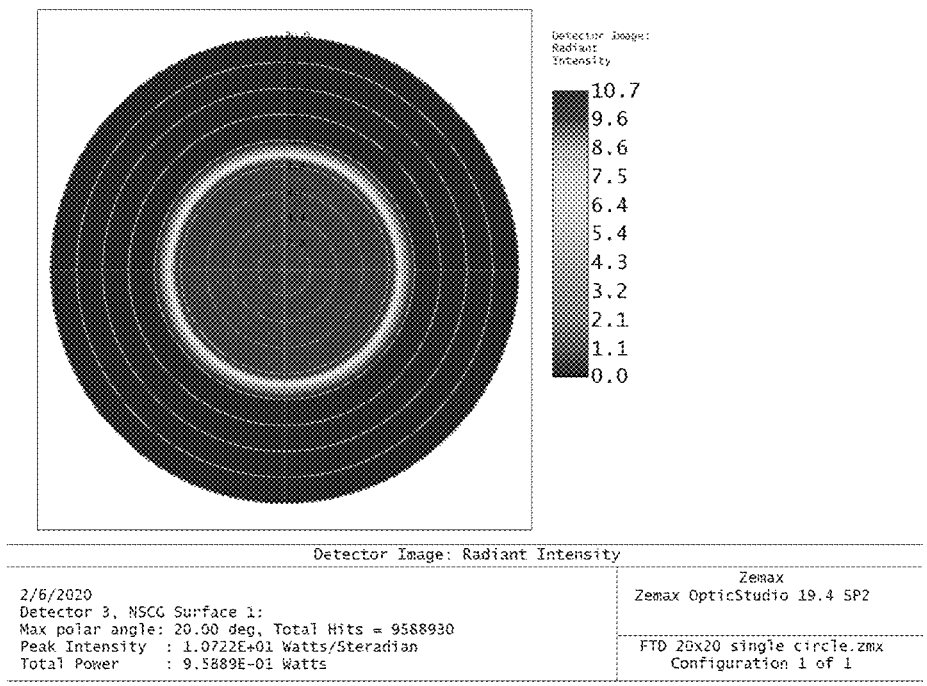
FIG. 6. Geometrical BSDF of a Flat Top Diffuser at 20 degrees Circle.
Figure 7:
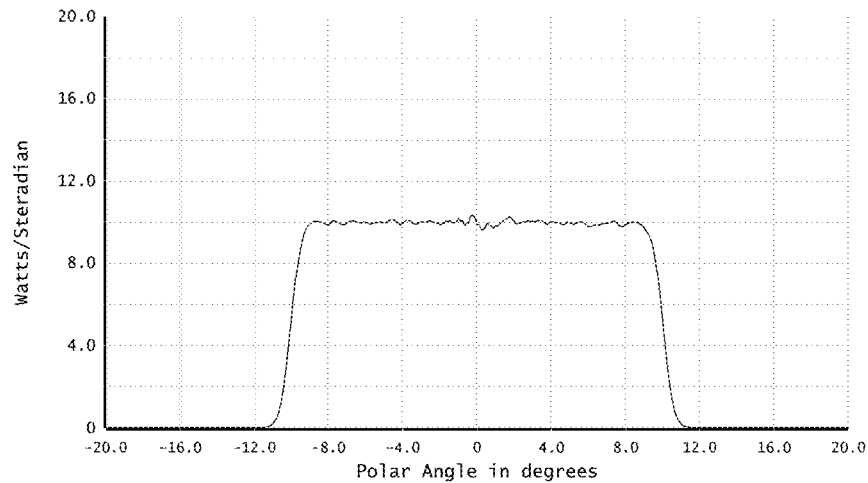
FIG. 7. Geometrical Horizontal Intensity Profile of a FTD 20 degrees Circle.
Figure 8:
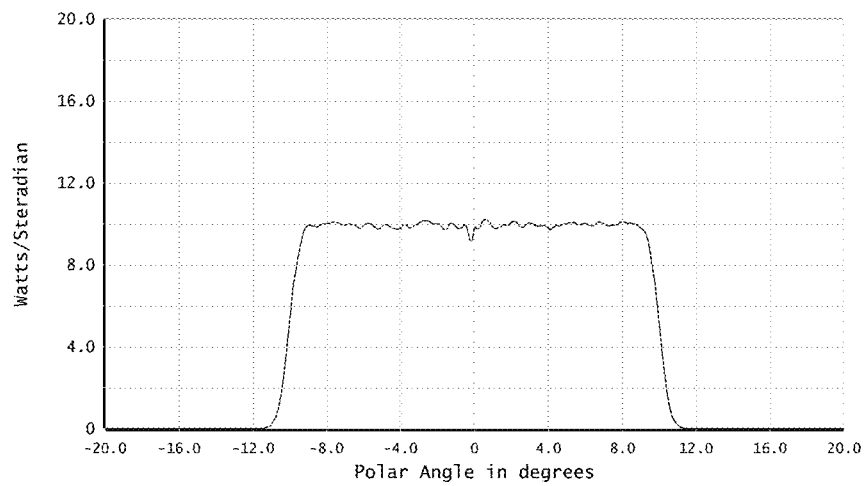
FIG. 8. Geometrical Vertical Intensity Profile of a FTD 20 degrees Circle.

The optical element can be designed to produce a flat top distribution (FTD). Flat-top/top-hat refers to a homogenized, projected image having uniform intensity. The intensity (the bidirectional scatter distribution function, BSDF, or the angular distribution) or irradiance profile (the projection onto a flat surface) can be a flat top, a gradient, or mixtures thereof. FIG. 2 illustrates the geometrical BSDF of a FTD as 20×20 degrees Square. FIG. 6 illustrates the geometrical BSDF of a FTD as 20 degrees circle. The optical element can have a coherent light source or an incoherent light source. The optical element can be utilized in either a transmissive or reflective mode. In one example of transmissive mode, a laser beam of coherent light transmits through an optical element and diffracts through the lenslets in the optical element and produces a light distribution, which has a desired irradiance or intensity profile, such as a flat top. In another example of transmissive mode, an incoherent light transmits through an optical element and refracts through the lenslets in the optical element and produces a light distribution, which has a desired irradiance or intensity profile, such as a flat top. In one example of reflection mode, a laser beam of coherent light is incident on the surface of an optical element and reflects off of the lenslets, which are naturally reflective or optically coated to be reflective) and produces a light distribution, which has a desired irradiance or intensity profile, such as a flat top. One reason for using reflective mode is that for a given slope of the lenslets, the reflective mode can achieve a higher angular distribution of the light irradiance or intensity profile.

In one embodiment, the optical element can also include a collimated or partially collimated light source. The light source is a coherent light source or an incoherent light source.

In an alternative embodiment, the intensity or irradiance profile comprises a flat top, a gradient, or mixtures thereof. In a different embodiment, where the intention is to have zero order or specular light, then the unit cell does not have to be filled by the lenslets 100%.

Also included herein is a method of making an optical element that uses a micro-optic unit cell comprising one or more lenslets. The method includes making an original photo resist master using a photolithography process, which can be done with a direct write laser machine. Subsequent masters can be made from a rubber master, plastic master, or metal master for replication purposes.

The method of construction of the micro-optic cell includes determining the BSDF or irradiance, as shown in FIGS. 2, 3, 4, 6, 7 and 8, from a single lenslet. The method also includes utilizing geometric lens design and statistical ray trace set from a standard optical raytracing program or from an in-house computational algorithm. This technique is used to determine the best lens sag(Z) shape to achieve the desired intensity profile, which can include a top hat (a uniform profile), gradient fall off (one or more high points in the center surrounded by a gradient, which decreases toward the edges), or gradient increase (one or more low points in the center, surrounded by a gradient, which increases towards the edges. The expected output is a beam homogenizer, corrector, or image projection to any shape, according to FIGS. 1, 2, 5 and 6, which can be an applied mask to the lens edge boundary.

Figure 10:
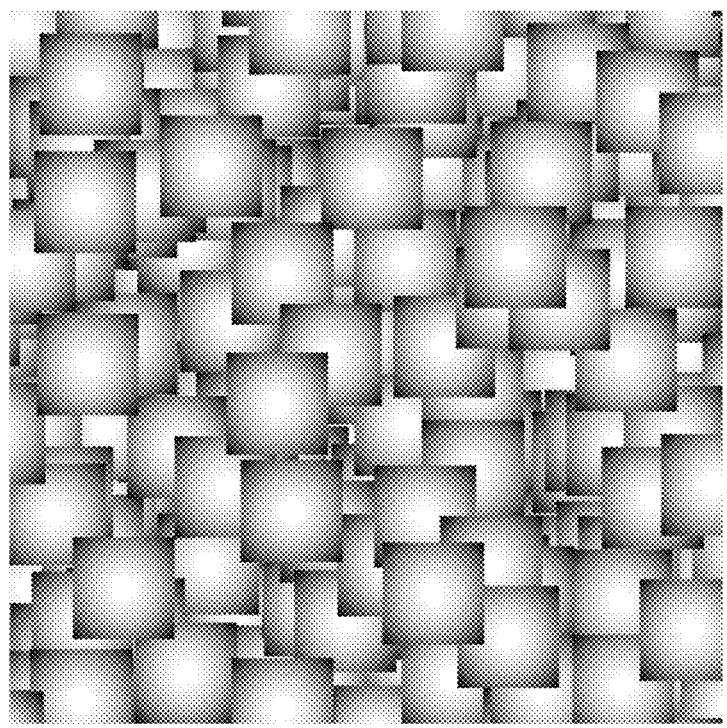
FIG. 10. Randomly Placed Lenslets (RPL) in a unit cell where the x and y positions are statistically randomly uniformly distributed.

A math program can be used to form a matrix of repeated lenslets in an MLA, shown in FIG. 9. Also, a random placement algorithm is used to place lenses in the unit cell with statistical uniform distribution. Each lens is positioned across the specified XY dimensions of the unit cell with statistically uniform random distribution positions of the lenslet to a unit cell as in FIG. 10. The lenslets all have identical size, shape (initially) and orientation. The size of the unit cell is predetermined based on the size of the lenslet, the aperture of the beam, and the design of the optical part. The process of randomization is based on statistical uniform distribution functions of a partial or full area of the unit cell and a process of digitally adding a pattern of a light shaping diffuser (LSD) on top of the lenslets in the micro-optic unit cell. In this process, previously written lenses can be overwritten several times by other lenslets positioned in the micro-optic unit cell. Also, lenses can wrap around the edge from right to left or bottom to top.

Figure 11:
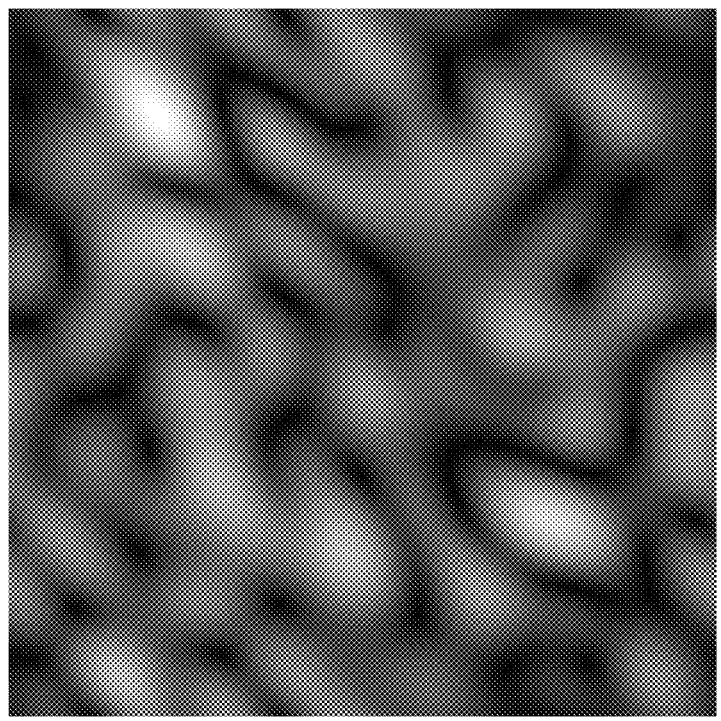
FIG. 11. The 3-D digital profile of a Light Shaping Diffuser (LSD®).

Next the image of a light shaping diffuser (LSD), as an example LSD® by Luminit LLC, FIG. 11, is either imported from a 3D imaging device, such as a microscope, or generated from a mathematical code. The height parameter of each pixel is added onto the corresponding array point of the two matrices, RPL lenslets and LSD®, as in FIG. 12, which shows an RPL with the LSD® depths added together.

Micro-lens arrays (MLAs), RPLs, and LSD can be fabricated using either a Direct-Write-Laser (DWL) technique that is capable of exposing grayscale or with the use of grayscale Photomasks. In the former technique, the lenslets, which are represented as grayscale bitmaps and are representative of the varying depths spatially, are imaged into photoresist. The other photolithography techniques, which uses dithered photomasks, can also be used to produce these microlenses in photoresist. The photoresist of choice is a low contrast photoresist that is suitable for grayscale imaging where variable exposure intensities are used to control the depths at every 'pixel' of the design. While DWL techniques make use of a rastering laser beam that is acoustically modulated via an acousto-optic modulator (AOM) to control the intensity of the rastering laser beam, a Photomask aligner or a stepper/scanner makes use of reduction lenses to expose these structures in resist. The photoresists are then developed in a developer bath, which results in the shapes of the microlenses. The exposure dose and/or development time in both the above lithography techniques are used to control the final depths or sags of the microlenses. The Peak-to-Valley (PV) depths/heights are theoretically calculated beforehand to achieve the right exposure conditions.

The structures in photoresist are then replicated into a rubber master (RM), transparent thermal or UV curable polymers. Nickel or metal masters can be made by transferring the surface relief micro-structure (SRMS) from the RM to a UV curable polymer, then utilizing electroplating techniques.

For transmissive parts, the refractive index of the replicating material/polymer is taken into consideration while designing the optical elements. Parts can be made in UV curable polymers from the master or submasters. For reflective parts, a metal or multilayer dielectric can be vacuum deposited onto the SRMS. Parts can be injection molded into a monolithic polymer form utilizing a metal master, such as Nickel. Parts can also be formed into glass, utilizing a RM in a SolGel process.

Figure 13:
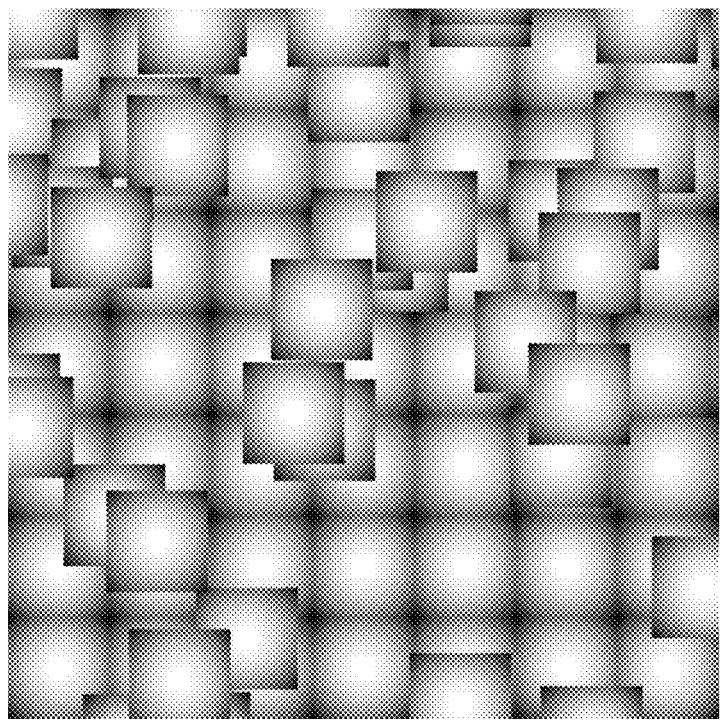
FIG. 13. MLA with Partial RPL.
Figure 14:
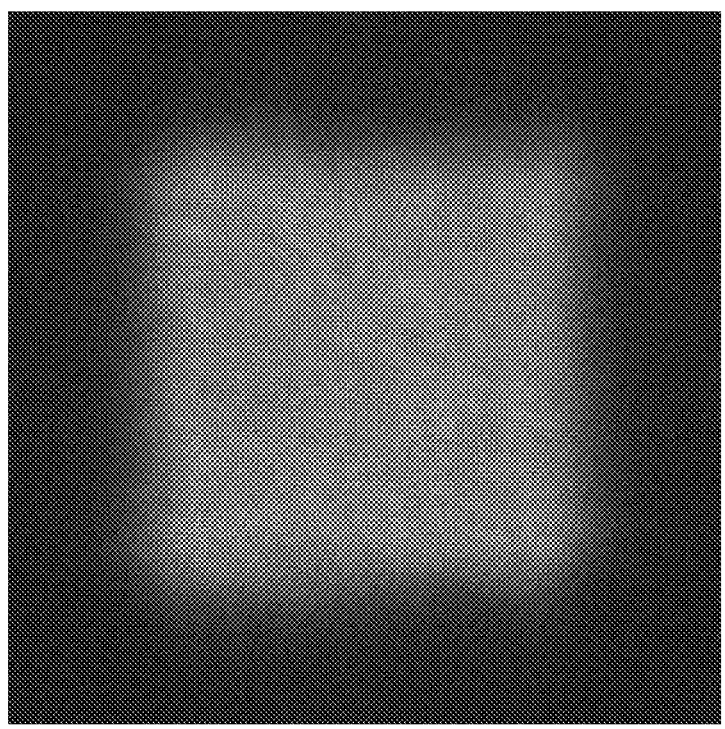
FIG. 14. BSDF or far field image simulation of a Surface Relief Micro-Structure (SRMS) containing MLA, Partial RPL and LSD®.
Figure 15:
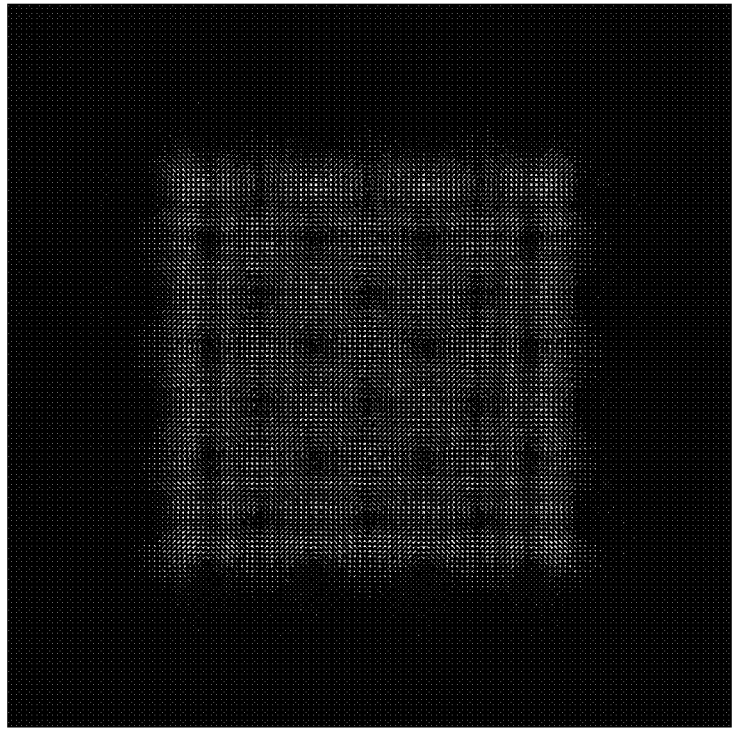
FIG. 15. BSDF or far field image simulation of a SRMS containing MLA only.
Figure 16:
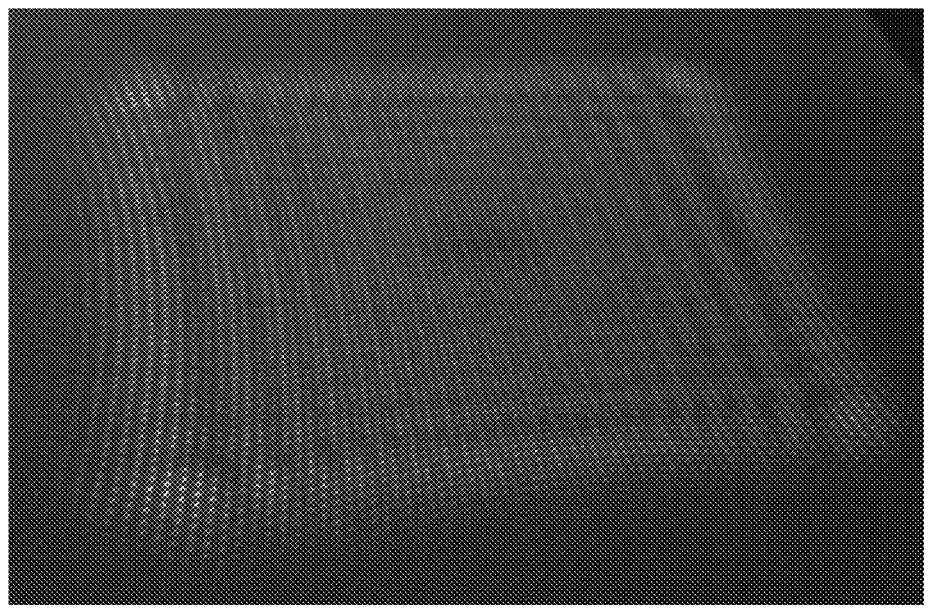
FIG. 16. Photograph of far field irradiance distribution of a regularly spaced MLA.
Figure 17:
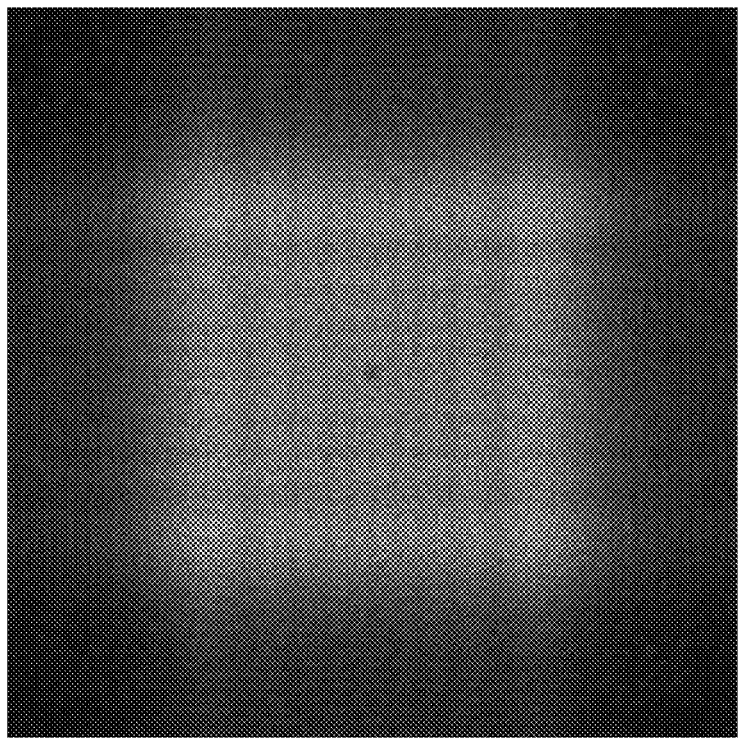
FIG. 17. Simulation of the FTD 20×20 far field pattern from RPL.
Figure 18:
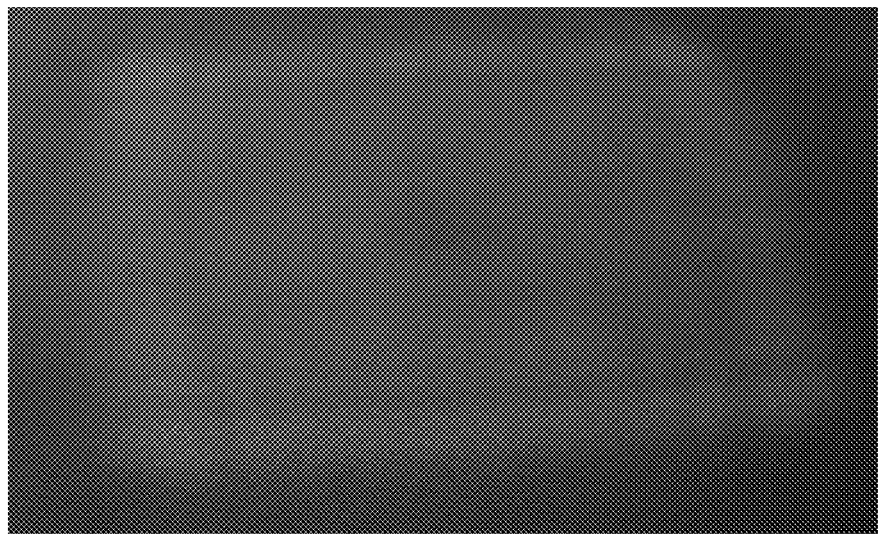
FIG. 18. Photograph of far field irradiance distribution of RPL.
Figure 19:
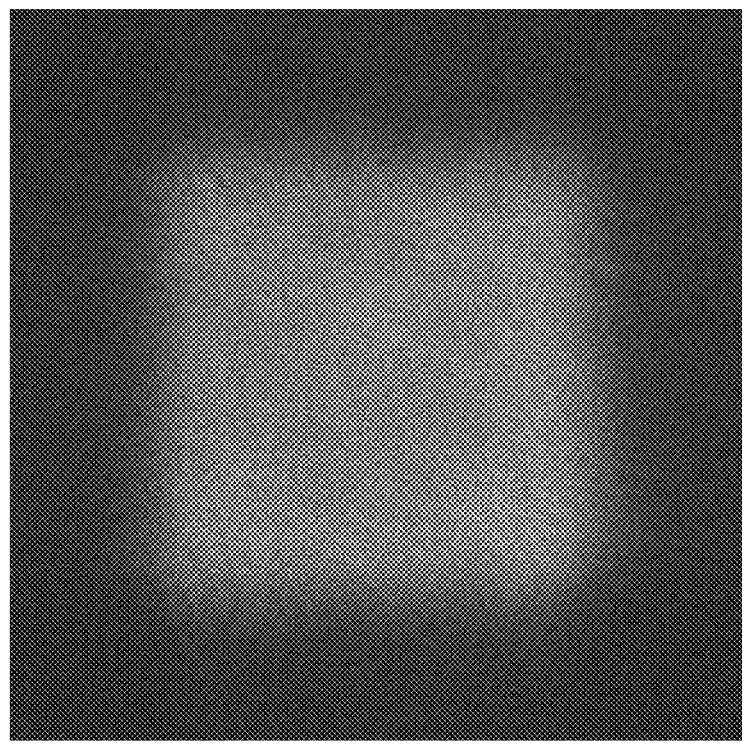
FIG. 19. Simulated diffraction pattern of an RPL with LSD® added.
Figure 20:
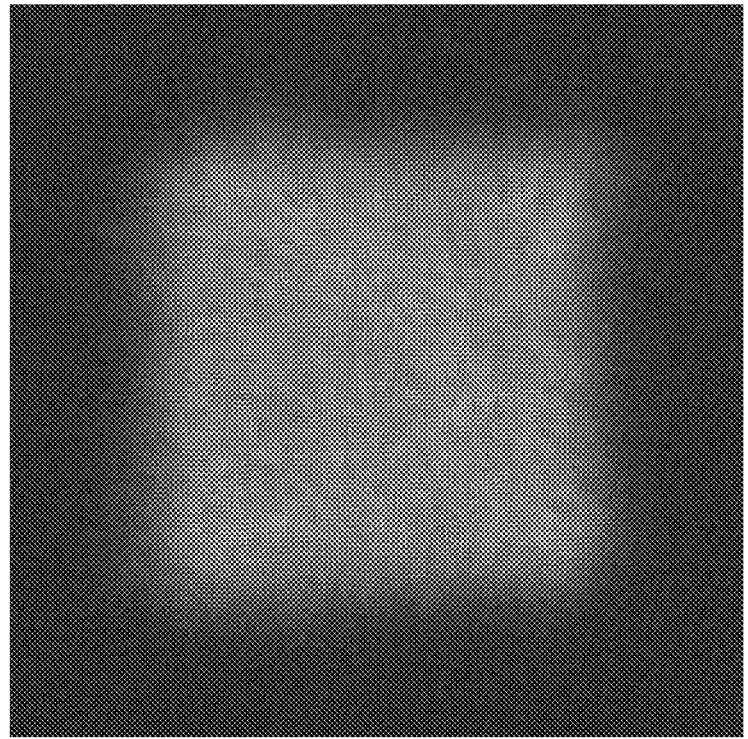
FIG. 20. Simulated diffraction pattern of an MLA with LSD® added.
Figure 21:
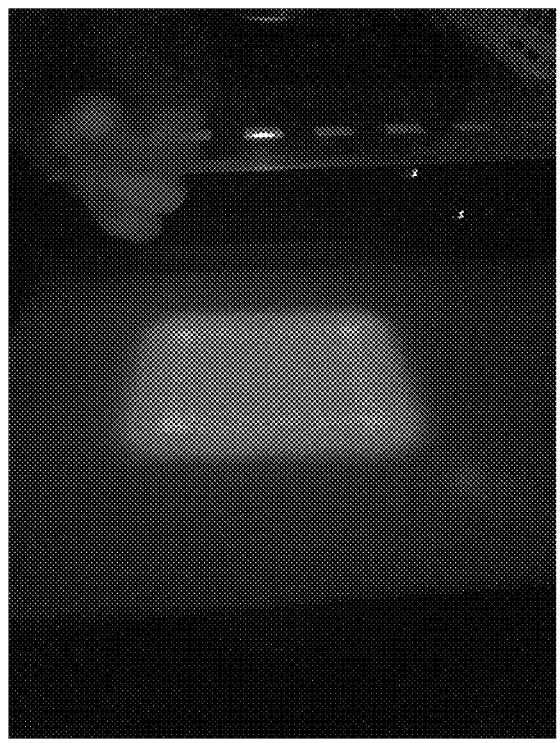
FIG. 21. Photograph of the far field pattern of a MLA, with LSD®.
Figure 22:
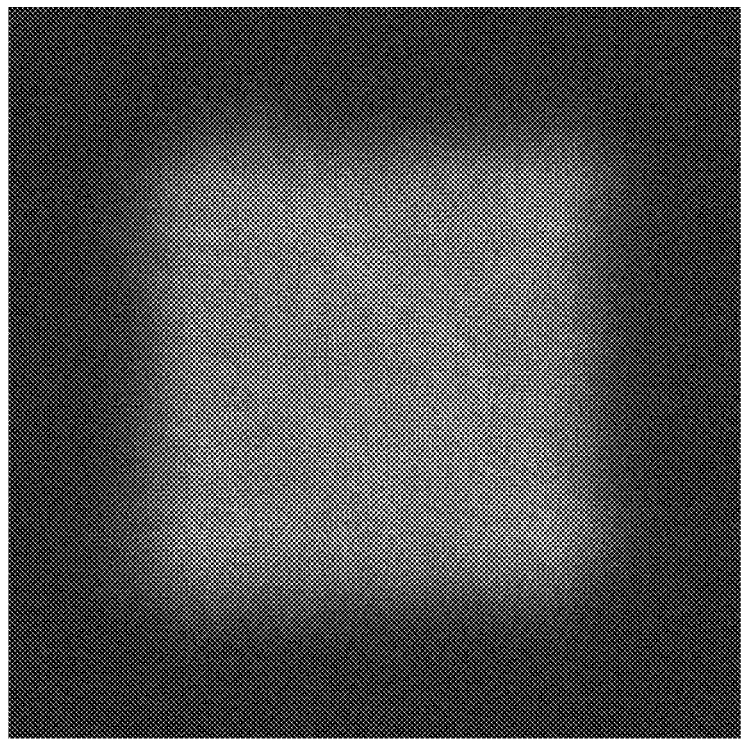
FIG. 22. Simulation of the far field pattern of a Micro-Lens Array, MLA, with partial RPL and LSD® added.
Figure 23:
FIG. 23. Photograph of the far field pattern of a MLA, with partial RPL, and LSD® added.

The micro-optic unit cell functions similarly to the expected function of a regular repeated MLA, in that the envelope of profile and boundary shape can be designed. One advantage is that this MLA with randomized RPL (FIG. 10) or partial RPL (FIG. 13), overwritten on MLA (FIG. 9) and added to LSD® (FIG. 11) have no regularly spaced dots (FIG. 14 shows BSDF of SRMA containing MLA, partial RPL, and LSD) as compared to FIG. 15 (shows BSDF of SRMS with MLA only) and FIG. 16 (shows far field irradiance distribution of a regularly spaced MLA), both of which having regularly spaced dots. In addition, the lower frequency diffraction pattern (as seen in FIGS. 15 through 18) is also eliminated, shown in FIGS. 19 to 23. Specifically, FIG. 17 shows a simulation of the FTD far field pattern from RPLs. FIG. 18 is a photograph of far field irradiance distribution of RPLs. FIG. 19 shows RPLs with LSD® and the simulated diffraction pattern. FIG. 20 is an MLA with LSD® added and the diffraction pattern. FIG. 21 is a photograph of the far field pattern of an MLA with a LSD®. FIG. 22 is a simulation of the far field pattern of a MLA with partial RPL with LSD® added. FIG. 23 is a photo if the far field pattern of a MLA with RPL and LSD® added.

Figure 12:
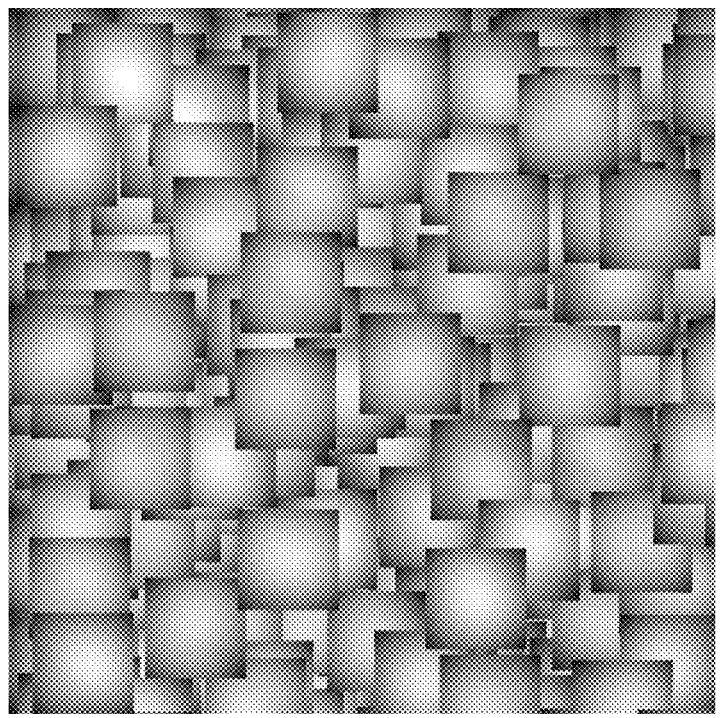
FIG. 12. RPL with LSD® depths added together.

In the cases where a percentage of lenslets are randomly added onto an MLA, usually the lenslets, which are overwritten, are no longer the same shape as the original lenslet. Thus, the final result is a combination of the original lenslet (which are the top most lenslets) and a myriad of shapes, which are the result of writing the original lenslet on top of already existing lenslets by placing them randomly. For example, FIGS. 12 and 13 shows many identical rectangle lenslets and underneath these are portions of the same rectangular lenslets. The boundary shape of all the lenslets that were placed in the figure are the same, but the boundary shapes of the resulting partial lenslets are altered due to being overwritten randomly.

To demonstrate the effects of the pattern types, a simulation of a select set of SRMS will be shown with the corresponding Far Field diffraction pattern. The regular MLA (FIG. 9) is shown to produce the dotted patterns seen in FIGS. 15 and 16. The 100 percent RPL (FIG. 10) by itself will produce the diffraction patterns in FIGS. 17 and 18. The full RPL with LSD® added will have a diffraction pattern as seen in FIG. 19. When an MLA is overwritten by a Partial RPL (FIG. 13), and then an LSD pattern (FIG. 11) is added on top, this will yield the diffraction pattern in FIG. 14. The structure of the full RPL with LSD® added on top is shown in FIG. 12. Also, the MLA with only LSD® on top is shown with the diffraction pattern in FIG. 20.

Figure 24:
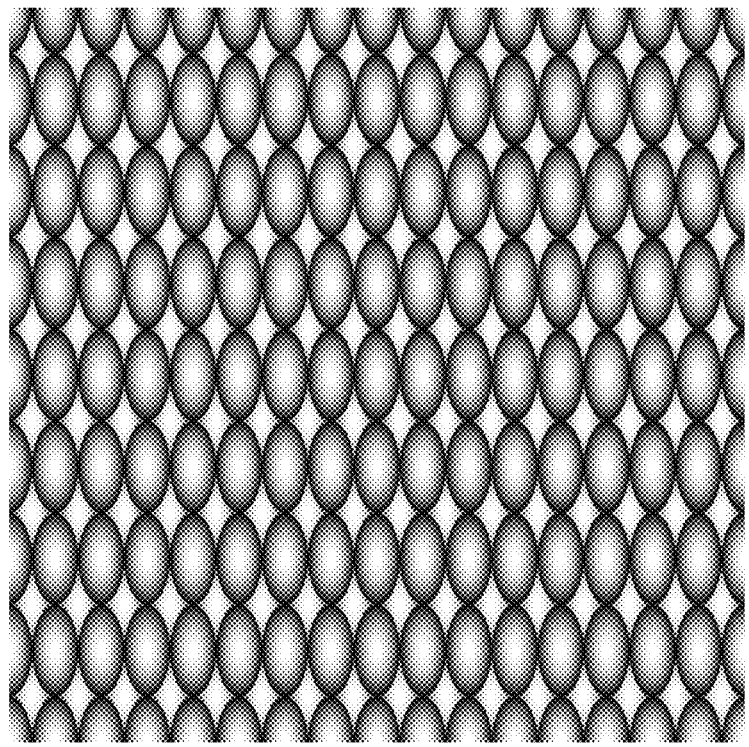
FIG. 24. MLA of Elliptical lenslets arranged in a very regular pattern.

To further demonstrate the effects of using RPL with LSD or using MLA with partial RPL with LSD, the following figures are of elliptical flat top diffuser structures and far field patterns. As needed, more than one array of the lenslets are used with an offset such that all the area in the micro-optic unit cell is filled in with lenslets. FIG. 24 shows an example in which elliptical lenslets completely fill in the area of the micro-optic unit cell. This is accomplished by an array of elliptical lenslets being overwritten with an identical array of elliptical lenslets, such that there is a lateral offset between the two arrays, such that there is no area of the micro-optic unit cell which is not covered by a lenslet. In the gaps of the full lenslets are the same lenslets with their vertices at the centers of the gaps.

Figure 25:
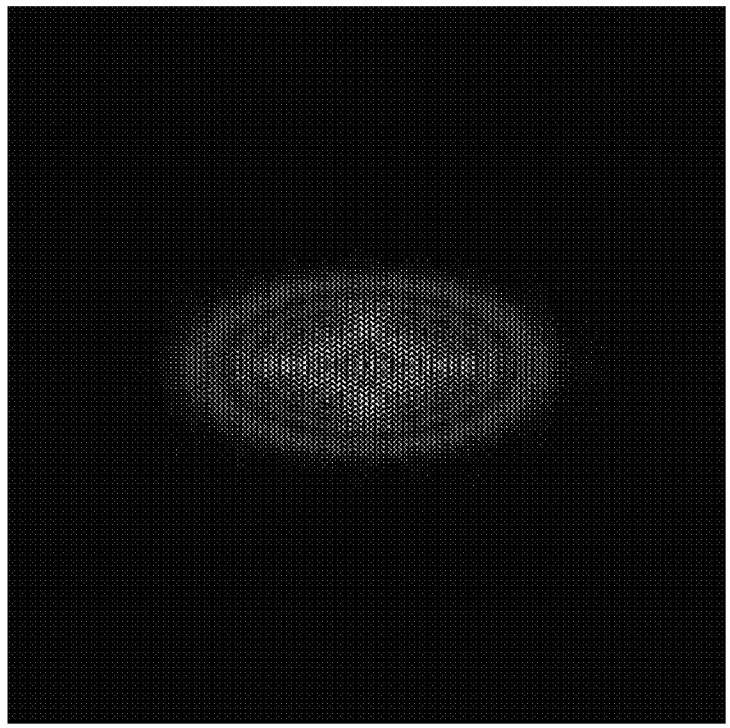
FIG. 25. Simulated far field diffraction pattern of the MLA of elliptical lenses.
Figure 26:
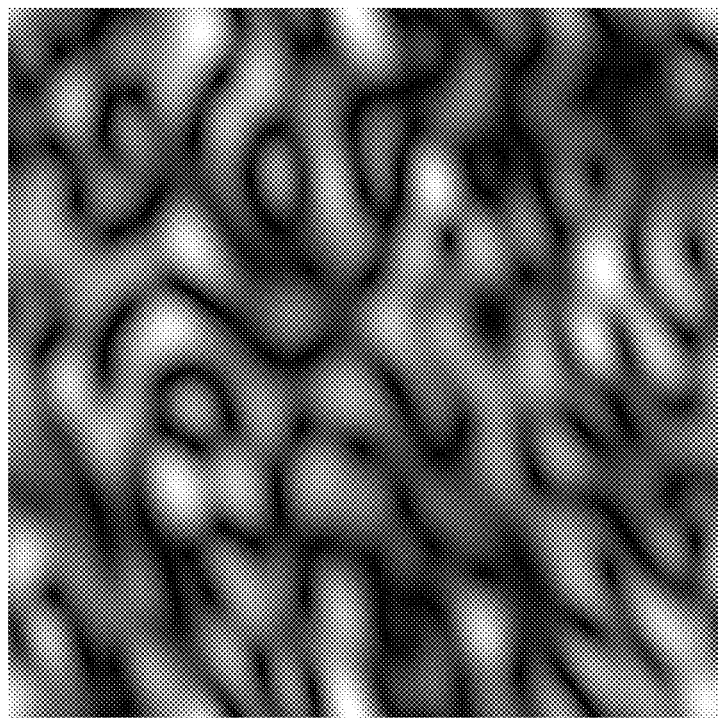
FIG. 26. LSD® with non-symmetrical aspect ratio (elliptical), which can be added on top of (Superimposed) Rectangular or Elliptical lenslets.
Figure 27:
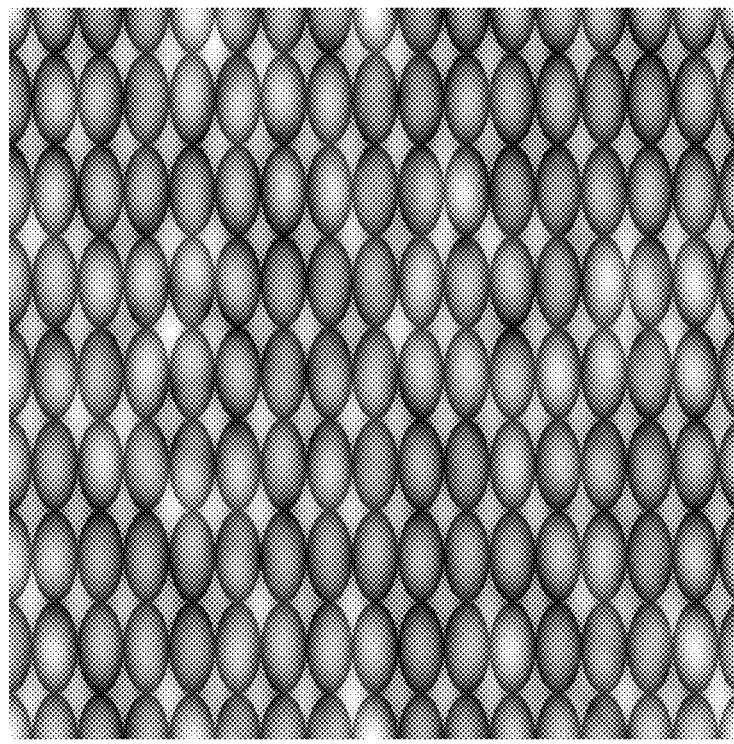
FIG. 27. Resulting structure after adding an LSD® on top of a MLA of elliptical lenslets.
Figure 28:
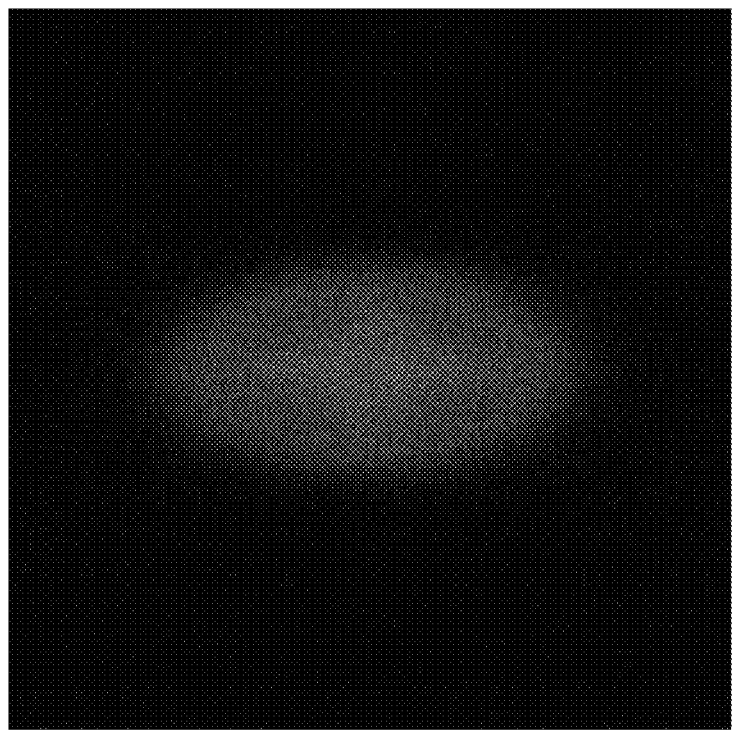
FIG. 28. Simulated far field effects of adding a regular MLA of elliptical lenslets with elliptical LSD.
Figure 29:
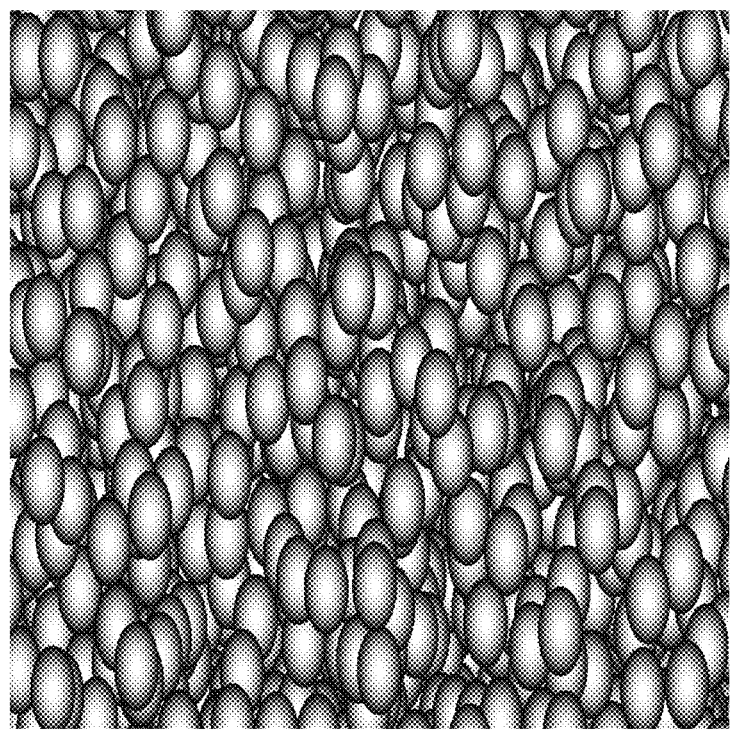
FIG. 29. RPL of elliptical lenslets within a micro-unit cell.
Figure 30:
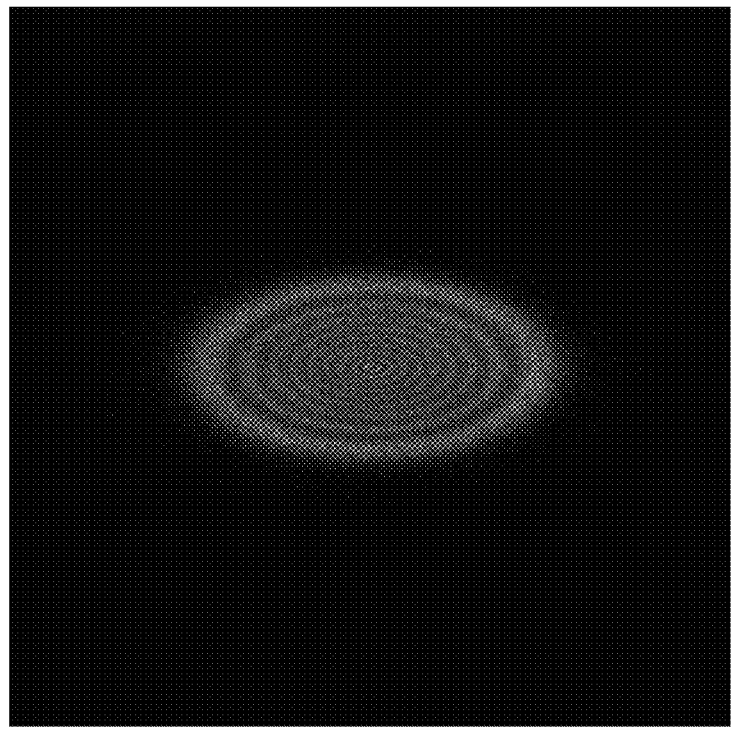
FIG. 30. Far field of RPL of elliptical lenses.
Figure 31:
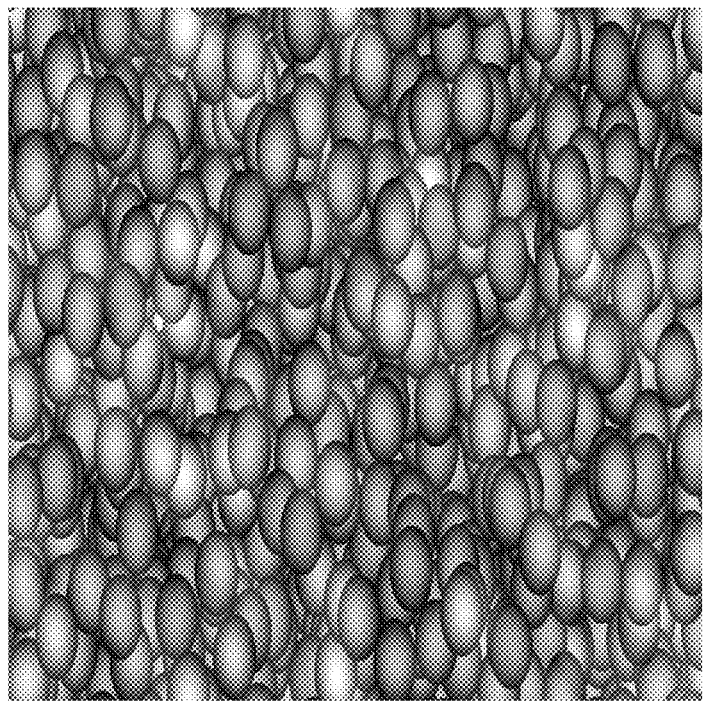
FIG. 31. RPL at 100% with LSD® added.
Figure 32:
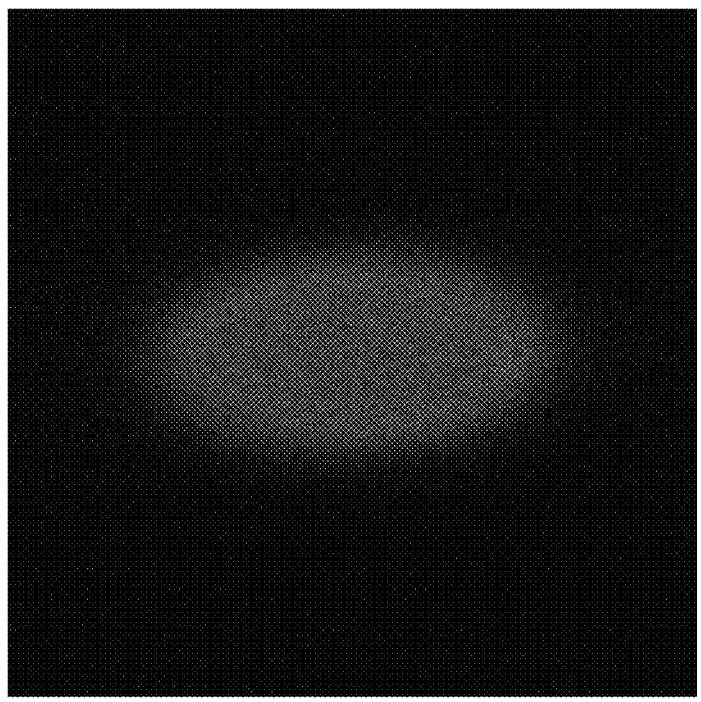
FIG. 32. Far Field of RPL at 100% with LSD® added.

The laterally offset MLAs (FIG. 24) will produce the dotted patterns with FIG. 25 (simulated far field diffraction pattern of the MLA of elliptical lenses). The dots are due to regular array pattern. The center brightness is due to overabundance of center area. The MLA (FIG. 24), superimposed with the LSD® (FIG. 26) will result in a structure such as FIG. 27. The far field pattern as seen in FIG. 28 (showing simulated far field effects of adding a regular MLA of elliptical lenslets with elliptical LSD®) will have a brighter area in the center, due to the statistics of the center being more prominent. Although the dots are gone, the center brightness is still an issue. This is a consequence of the ellipse having an imperfect fill, unlike rectangles and hexagons in a geometric array. Using a pure RPL of ellipses, such as FIG. 29, results in a set of elliptical rings in the far field diffraction pattern, as seen in FIG. 30. The ring structure exists using a pure RPL. This is analogous to the cross-hatched, ringing diffraction pattern (FIGS. 17 and 18) seen for the square pure RPL (FIG. 10) structure. For the ellipse, which does not possess an array with perfect fill, the pure RPL (FIG. 29) and the LSD® (FIG. 26) when superimposed (FIG. 31) results in the best option as seen in FIG. 32, where the pattern does not have the dots from MLA, nor a center brightness issue from non-perfect fill, nor a ring structure from diffraction effects.

Figure 33:
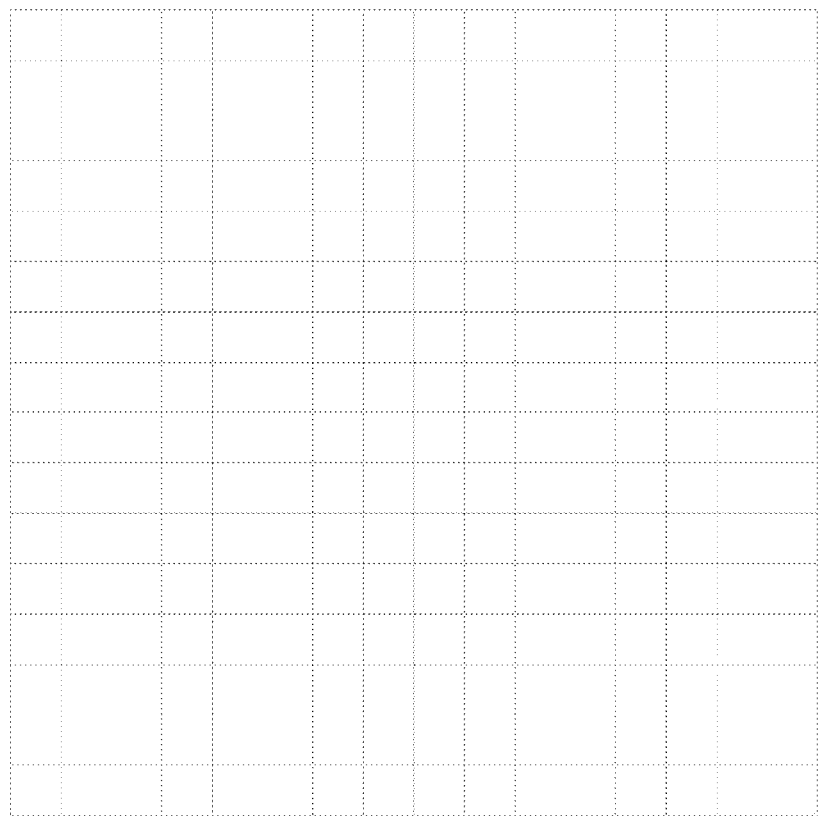
FIG. 33. MLA of rectangular lenslets with rows of equal width with respect to each other and columns of equal width with respect to each other.
Figure 34:
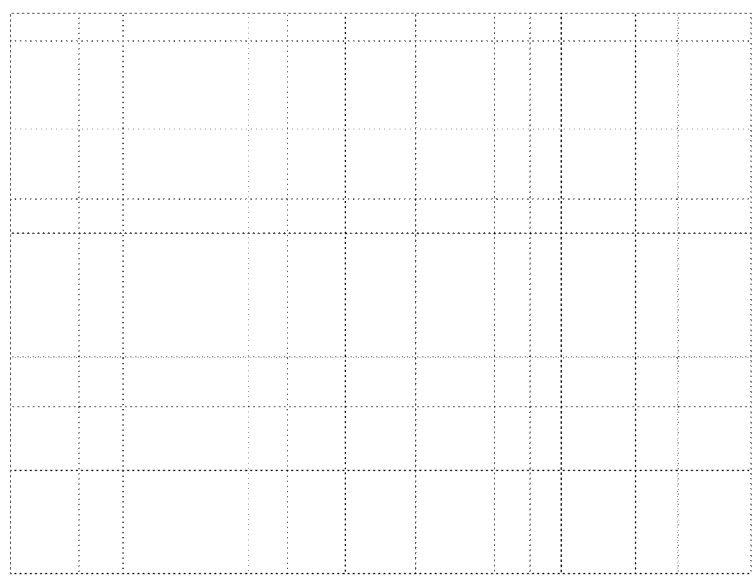
FIG. 34. MLA of rectangular lenslets with rows of unequal widths with respect to each other and columns of unequal width with respect to each other.
Figure 35:
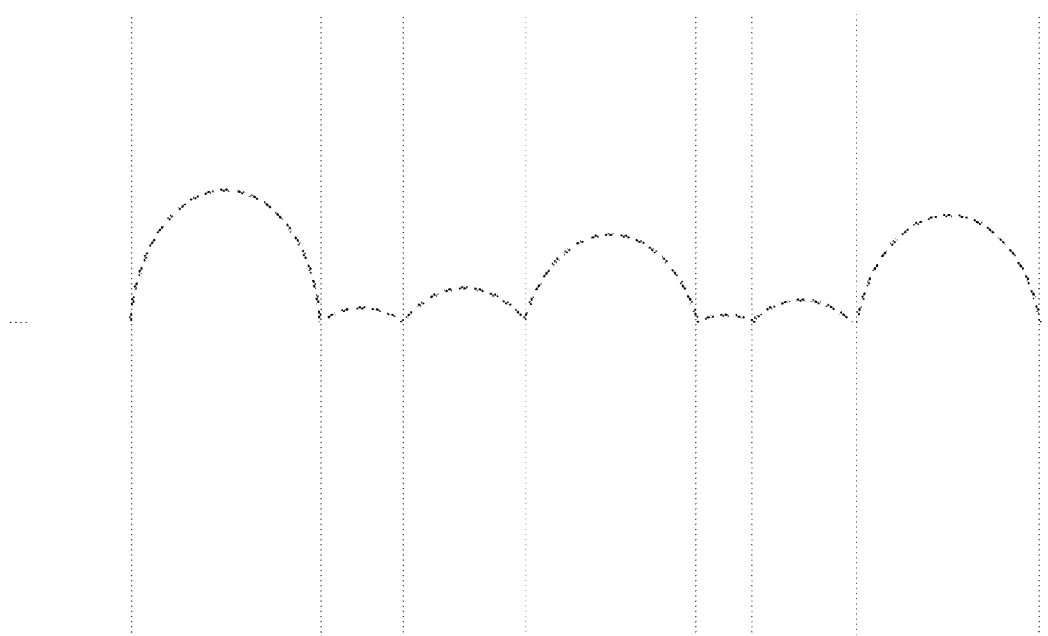
FIG. 35. Side View of lenslets in an MLA in which the columns do not have equal widths.

In another embodiment, the grid used for aligning the rows and columns of the micro-lens array is adjusted and randomized in such a way as to make the width of each row and each column one of the parameters that is randomized and varied. This can apply to lenslets, such as rectangles, parallelograms, rhombuses, and squares, etc. with FIG. 34 as an example. FIG. 33 shows an MLA made of rectangular lenslets with rows of equal width with respect to the other rows and columns of equal width with respect to the other columns. FIG. 34 shows an array of scaled lenslets made of rectangular lenslets with rows of unequal widths with respect to the other rows and columns of unequal width with respect to the other columns. In FIG. 34, the width of each row is constant along the length of the row and the width of each column is constant along the length of each column. An LSD structure is added on top of these lenslets. FIG. 35 shows the side view of the profile of lenslets in which the widths of the columns is varied randomly. The lenslets are scaled appropriately to fill the row and column where the lenslet exists in the MLA. In one embodiment, the boundary shapes of the lenslets are not the same. FIG. 34 shows lenslets, which are rectangles of different sizes and shapes. FIG. 35 shows the side view of an example of FIG. 34.

In another embodiment, the array of rectangular lenslets has all the lenslets scaled, such that they all have the same ratio of the X axis width to the Z axis height, and the same ratio of the Y axis width to the Z axis height per their design when compared to the lenslets with rows of equal widths and columns of equal widths with respect to each other. In other words, the size of each lenslet is scaled in size such that the ratio of the width of the lenslet to the height of the lenslet is constant, and the ratio of the length of the lenslet to the height of the lenslet is constant.

Figure 36:
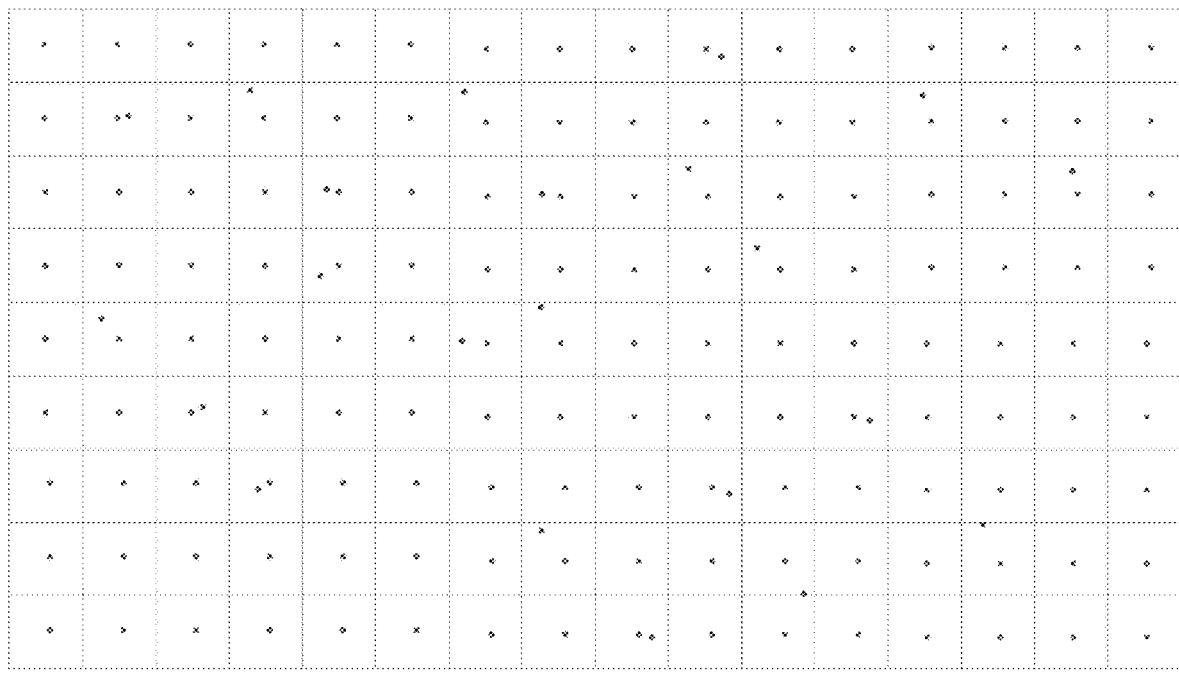
FIG. 36: Top view of MLA only showing the grid of boundaries between lenslets and the centers of each boundary (blue dot) and the adjusted centers of some of the profiles (red dots).
Figure 37:
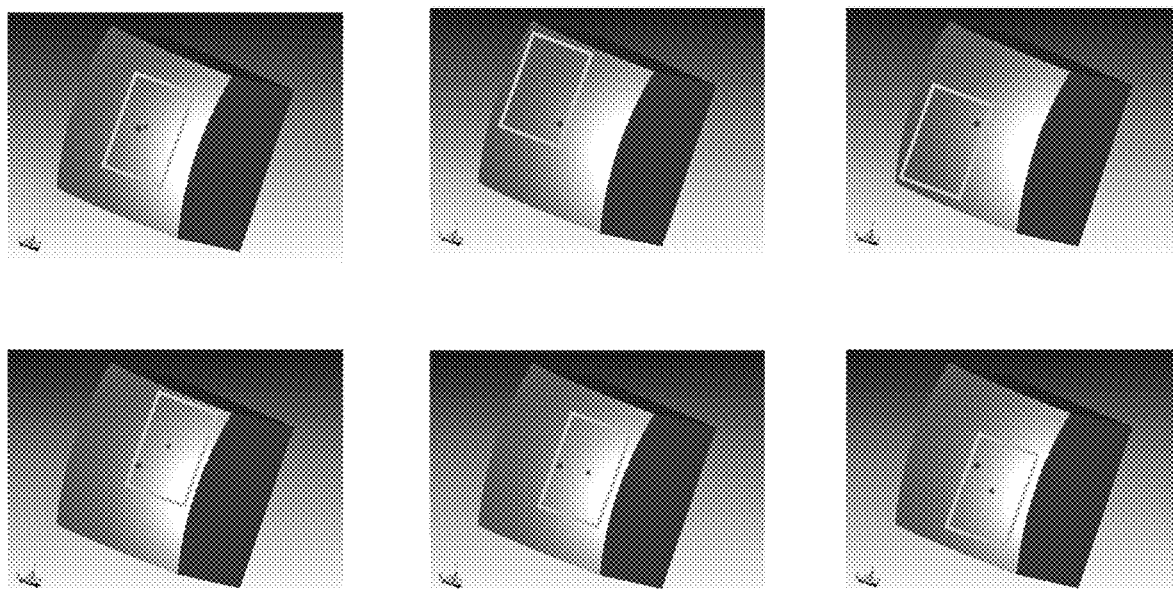
FIG. 37. Six different examples of a Source Surface Profile, SSP, (grey surface) with the center (vertex) shown as a red Dot and the boundary of the lenslet shown as a yellow rectangle with the center of the boundary, shown as a blue Dot.

In another embodiment, the position of the optical axis (vertex), of a percentage from 0% to 100%, of the lenslets in a MLA is randomly varied with respect to the boundary of the lenslet, as can be seen in FIGS. 36 and 37. This technique can product a variety of intensity or irradiance profiles. In this embodiment, a micro-lens array of lenslets is overlaid with a light shaping diffuser pattern, as an example LSD®, and a percentage from 0% to 100% of the lenslets in the array have the vertex of the surface profile randomly shifted within the boundary of the lenslet, while the boundaries of the lenslets remain in a fixed array (FIGS. 36 and 37).

The Source Surface Profile (SSP) refers to a mathematical surface profile of a lenslet. Six different examples of a Source Surface Profile (SSP) are shown with the same SSP used for all of the lenslets (the grey surface in FIG. 37), but for a portion of the lenslets in the array, from 0 to 100%, the position of the vertex of the SSP is shifted with respect to the center of the boundary of the lenslet. The boundary of the lenslet can be centered or not centered with respect to a center, vertex, or an optical axis of a SSP. For each lenslet, a portion of the same SSP is used to make the final surface of each lenslet. There is an array of boundaries and each boundary is the same size and shape and each boundary is filled in with a portion of the SSP to make the final lenslet within each boundary. The boundary defines the portion of the SSP that will be used to form the lenslet in the boundary. The portion of the SSP that is outside a given boundary is not used to form the lenslet in the given boundary. The position of the vertex of the SSP with respect to the center of each boundary varies. For a percentage of the boundaries, from 0% to 100%, the vertex of the SSP is not aligned with the center of the boundary, but rather the position of the vertex of the SSP varies randomly in position with respect to the center of the given boundary. For the remaining lenslets, the vertex of the SSP is aligned with the center of the boundary.

The size of the SSP is larger than the size of the boundary and the vertex of the SSP does not move too far from the center of the boundary, such that a portion of the boundary is empty. For example, with boundaries that are all the same size rectangles, which are arranged in an array of rectangles, the SSP would be a rectangle that is at least twice as wide as the width of the boundary and at least twice as long as the length of the boundary. The vertex of the SSP would not shift in the width or length dimension beyond the edge of the boundary so that there is never an empty region in the boundary. The lenslets for which the vertex is shifted can be randomly selected and the amount of shift is random. The portion of the entire SSP that is used to form each lenslet will vary. In this embodiment, the rectangular boundary of each lenslet defines which portion of the SSP is used as the final surface of the lenslet. Hence, in this example, each lenslet is a rectangle of the same size, but the surface of the lenslets vary.

In another embodiment, each lenslet comprises a portion of a Source Surface Profile (SSP); wherein a vertex of the SSP is shifted by a fixed or random amount in a plane of the MLA with respect to the lenslet boundary; wherein the lenslet boundary is fully filled with a portion of the SSP; wherein a vertex of the SSP is shifted with respect to the lenslet boundary for 0-100% of the lenslets; and wherein the lenslets comprise a same size.

In another embodiment, the MLA comprises an array of rectangular lenslets; wherein the boundary of each lenslet has the same shape and size; wherein a surface of each lenslet is a portion of a same Source Surface Profile (SSP); wherein a width of the SSP is at least twice as wide as a width of the boundary of the lenslet; wherein a length of the SSP is at least twice as long as a length of the boundary of the lenslet; wherein a position of a vertex of an SSP is varied with respect to a center of a boundary of the lenslet for 0-100% of the lenslets; wherein a direction and amount that a position of a vertex of an SSP is varied with respect to a center of the boundary of the lenslet is random or controlled; wherein the lenslet boundary is filled with a portion of the SSP; and wherein a final surface of each lenslet comprises a portion of the SSP that is within the boundary of the lenslet.

FIG. 36 shows the top view of a micro-lens array formed by an array of rectangles. Each rectangle is a boundary of a lenslet. The blue dots represent the center of each boundary. The red dots represent the vertex of SSPs which are shifted away from the center of the boundary. When there is not a red dot, the blue dot is the center of the profile. In the boundaries without red dots, the SSP has the same center as the boundary.

FIG. 37 shows six examples of a SSP varying in position with respect to a rectangular boundary of a lenslet. The yellow rectangle is the boundary of the lenslet and has a center indicated by the blue dot and the grey SSP has a center indicated by the red dot. FIG. 37 shows separate examples in which the SSP is in a different position with respect to the lenslet boundary in each example. The SSP position can be varied randomly with respect to the center of the lenslet boundary or in a determined way. An MLA can have any combination of lenslets with a centered SSP, randomly positioned SSP, or a deterministically placed SSP. The lenslets with deterministically placed SSPs can follow a pattern or gradient. In each of the six configurations in FIG. 37, the boundary does not go beyond the edge of the SSP. For a given boundary, once the SSP is established in relation to the boundary, the portion of the SSP that is outside the boundary is removed and the lenslet comprises the portion of the SSP that is within the boundary. Once the full array of lenslets is defined, the LSD pattern is overlaid on the surface of the final lenslets.

In another embodiment, a grid used for aligning rows and columns of the MLA is randomized and varied as to a y dimension of each row and as to an x dimension of each column.

In another embodiment, the aspect ratio of each lenslet is the same; wherein a size of each lenslet is scaled in size such that the lenslet fills in its boundary of its row and column; wherein a ratio of a width of the lenslet to a height of the lenslet is constant; and wherein a ratio of a length of the lenslet to a height of the lenslet is constant. The lenslets comprise rectangles, parallelograms, rhombuses, or squares; and wherein a y dimension of each row is constant along a length of an entire row and an x dimension of each column is constant along an entire column.

In another embodiment, the lenslets are rectangles; wherein the y dimension of each row is constant along the entire row; wherein the y dimension of each row varies with respect to the y dimensions of the other rows; wherein the x dimension of each column is constant along the entre column; and wherein the s dimension of each column varies with respect to the x dimension of the other columns.

In another embodiment, replicated parts with one or more of these MLAs comprised of one of more lenslets can be made by replicating parts from a rubber master, glass master, metal master, plastic master, or any solid material that can be used for replication. The method to form a master can include a photolithography process or the use of a direct write laser machine. In one embodiment, the master is used to replicate parts and the replicas can be used as further masters for more replicas.

In another embodiment, the optical element resulting from the masters are optical in nature, where some portion of the electromagnetic (EM) spectrum is propagated onto and through for refractive results of the desired intensity or irradiance profiles. In a different embodiment, the optical elements can also be used in reflective mode where the desired intensity or irradiance profiles are designed. An additional embodiment includes a mixture of the transmitted and reflected components of the EM spectrum, which are used in combination. In an additional embodiment, the materials have corresponding optical properties appropriate to the effect desired by the user of the optical element. The materials for the optical element can be made of any solid having optical properties, such as plastics, UV cured epoxies, resins, glass, crystals, metals, coated surfaces, and mixtures thereof.

When introducing elements of the present disclosure, the articles "a", "an", "the", and "said" are intended to mean that there are one or more of the elements. The terms "comprising", "including", and "having" are intended to be inclusive and mean that there may be additional elements other than the listed elements.

Alternative embodiments of the subject matter of this application will become apparent to one of ordinary skill in the art to which the present invention pertains without departing from its spirit and scope. It is to be understood that no limitation with respect to specific embodiments shown here is intended or inferred.

We claim:

1. An optical element comprising one or more micro-optic unit cells;
    wherein each micro-optic unit cell is comprised of one or more lenslets;
    wherein each lenslet has a boundary shape;
    wherein the lenslets are configured in a regularly spaced micro-lens array (MLA);
    wherein the lenslets are overwritten with randomly placed lenses (RPLs), which cover from greater than 0 percent to 99 percent of the MLA; and
    wherein a light shaping diffuser pattern is added on top of the micro-optic unit cell.

2. The optical element of claim 1 wherein the boundary shape of the lenslet comprises a square, a rectangle, a circle, an ellipse, a hexagon, a star, a cross, a logo, a generic geometrical shape, or a mixture thereof.

3. The optical element of claim 1 further comprising a collimated or partially collimated light source comprising coherent light source or an incoherent light source.

4. The optical element of claim 1 wherein an intensity or irradiance profile of the optical element comprises a flat top, a gradient, or a mixture thereof.

5. The optical element of claim 1 wherein a size of the micro-optic unit cell is based on lenslet size, beam size, source size, shape of the optical element, or a mixture thereof.

6. The optical element of claim 1 wherein the lenslet wraps around one or more edges of the micro-optic unit cell.

7. The optical element of claim 1 wherein the lenslet comprises a size with lateral dimensions in the range of about 10-500 micrometers.

8. The optical element of claim 1 wherein the micro-optic unit cell comprises a size with lateral dimensions in the range of about 0.1-500 millimeters.

9. The optical element of claim 1 wherein the optical element comprises a size with lateral dimensions in the range of about 0.1 millimeters to about 1 meter.

10. The optical element of claim 1 wherein the boundary of the lenslet is centered or not centered with respect to a center, a vertex or an optical axis of a source surface profile.

11. The optical element of claim 1 wherein the lenslets all have the same size and shape initially.

12. The optical element of claim 1 wherein the lenslets all have the same orientation (not rotated) with respect to each other.

13. The optical element of claim 1 wherein each lenslet comprises a portion of a Source Surface Profile (SSP); wherein a vertex of the SSP is shifted by a fixed or random amount in a plane of the MLA with respect to the lenslet boundary; wherein the lenslet boundary is fully filled with a portion of the SSP; wherein a vertex of the SSP is shifted with respect to the lenslet boundary for 0-100% of the lenslets; and wherein the lenslets comprise a same size.

14. The optical element of claim 1 wherein the MLA comprises an array of rectangular lenslets;
    wherein the boundary of each lenslet has the same shape and size; wherein a surface of each lenslet is a portion of a same Source Surface Profile (SSP);
    wherein a width of the SSP is at least twice as wide as a width of the boundary of the lenslet;
    wherein a length of the SSP is at least twice as long as a length of the boundary of the lenslet;
    wherein a position of a vertex of an SSP is varied with respect to a center of a boundary of the lenslet for 0-100% of the lenslets;
    wherein a direction and amount that a position of a vertex of an SSP is varied with respect to a center of the boundary of the lenslet is random or controlled;
    wherein the lenslet boundary is filled with a portion of the SSP; and
    wherein a final surface of each lenslet comprises a portion of the SSP that is within the boundary of the lenslet.

15. The optical element of claim 1 wherein a grid used for aligning rows and columns of the MLA is randomized and varied as to a y dimension of each row and as to an x dimension of each column.

16. The optical element of claim 15 wherein an aspect ratio of each lenslet is the same; wherein a size of each lenslet is scaled in size such that the lenslet fills in its boundary of its row and column; wherein a ratio of a width of the lenslet to a height of the lenslet is constant; and wherein a ratio of a length of the lenslet to a height of the lenslet is constant.

17. The optical element of claim 15 wherein the lenslets comprise rectangles, parallelograms, rhombuses, or squares; and wherein a y dimension of each row is constant along a length of an entire row and an x dimension of each column is constant along an entire column.

18. The optical element of claim 1 wherein a tilt of an optical axis of 0-100% of the lenslets varies and is randomized for 0-100% of the lenslets.

19. The optical element of claim 15 wherein the lenslets are rectangles; wherein the y dimension of each row is constant along the entire row; wherein the y dimension of each row varies with respect to the y dimensions of the other rows; wherein the x dimension of each column is constant along the entre column; and wherein the s dimension of each column varies with respect to the x dimension of the other columns.

20. A method of making an optical element comprising a micro-optic unit cell comprised of multiple lenslets wherein the method comprises a process of randomization based on statistical uniform distribution functions of a partial or full area of the micro-optic unit cell and a process of digitally adding a pattern of a light shaping diffuser on top of the micro-optic unit cell.

21. The optical element of claim 1 wherein an intensity or irradiance profile of the optical element comprises a flat top.

22. The optical element of claim 1 wherein an intensity or irradiance profile of the optical element comprises a gradient.

23. The optical element of claim 1 further comprising a collimated or partially collimated light source comprising a coherent light source.

24. The optical element of claim 1 further comprising a collimated or partially collimated light source comprising an incoherent light source.

25. An optical element comprising one or more micro-optic unit cells;
   wherein each micro-optic unit cell is comprised of one or more lenslets;
   wherein each lenslet has a boundary shape;
   wherein the lenslets are configured in a regularly spaced micro-lens array (MLA);
   wherein the lenslets are overwritten with randomly placed lenses (RPLs), which cover from greater than 0 percent to 99 percent of the MLA;
   wherein a light shaping diffuser pattern is added on top of the micro-optic unit cell; and
   an incoherent light source, wherein an intensity or irradiance profile of the optical element comprises a flat top or a gradient when illuminated by the incoherent light source.

26. An optical element comprising one or more micro-optic unit cells;
   wherein each micro-optic unit cell is comprised of one or more lenslets;
   wherein each lenslet has a boundary shape;
   wherein the lenslets are configured in a regularly spaced micro-lens array (MLA);
   wherein the lenslets are overwritten with randomly placed lenses (RPLs), which cover from greater than 0 percent to 99 percent of the MLA;
   wherein a light shaping diffuser pattern is added on top of the micro-optic unit cell; and
   a coherent light source, wherein an intensity or irradiance profile of the optical element comprises a flat top or a gradient when illuminated by the coherent light source.

27. An optical element comprising one or more micro-optic unit cells;
   wherein each micro-optic unit cell is comprised of one or more lenslets;
   wherein each lenslet has a boundary shape;
   wherein the lenslets are configured in a regularly spaced micro-lens array (MLA);
   wherein the lenslets are overwritten with randomly placed lenses (RPLs), which cover from greater than 0 percent to 100 percent of the MLA; and
   wherein a light shaping diffuser pattern is added on top of the micro-optic unit cell.

* * * * *